United States Patent [19]

Barker et al.

[11] Patent Number: 4,594,774

[45] Date of Patent: Jun. 17, 1986

[54] MACHINES FOR DISMANTLING DECOMMISSIONED NUCLEAR REACTORS

[75] Inventors: Allan Barker, Chester, England; Nigel W. Collins, Caldicot, Wales

[73] Assignee: United Kingdom Atomic Energy Authority, London, England

[21] Appl. No.: 607,820

[22] Filed: May 7, 1984

[30] Foreign Application Priority Data

Mar. 27, 1984 [GB] United Kingdom ................. 8407901

[51] Int. Cl.[4] .............................................. B23P 19/00
[52] U.S. Cl. .................... 29/723; 29/400 N; 29/426.1; 376/249; 376/260; 376/308
[58] Field of Search ................... 29/400 N, 723, 426.1, 29/426.2, 426.3; 376/249, 260, 308, 261, 262, 263, 264

[56] References Cited

U.S. PATENT DOCUMENTS

| | | | |
|---|---|---|---|
| 3,072,554 | 1/1963 | Madsen | 376/263 |
| 3,271,262 | 9/1966 | Hutchinson et al. | 376/262 |
| 3,901,073 | 8/1975 | Dent et al. | 376/249 X |
| 4,036,687 | 7/1977 | Rickard et al. | 376/260 X |
| 4,174,999 | 11/1979 | Burns | 376/249 |
| 4,217,173 | 8/1980 | Jabsen | 376/249 X |
| 4,311,556 | 1/1982 | Iwamoto et al. | 376/249 |
| 4,374,801 | 2/1983 | Albin | 376/264 |
| 4,436,694 | 3/1984 | Vassalotti et al. | 376/249 X |

FOREIGN PATENT DOCUMENTS

| | | | |
|---|---|---|---|
| 104258 | 7/1964 | Norway | 376/262 |
| 889709 | 2/1962 | United Kingdom | 29/723 |
| 932794 | 7/1963 | United Kingdom | 29/723 |
| 1248932 | 10/1971 | United Kingdom | 29/723 |
| 1335332 | 10/1973 | United Kingdom | 29/723 |
| 1472477 | 5/1977 | United Kingdom | 29/723 |
| 1550975 | 8/1979 | United Kingdom | 29/723 |
| 2060238 | 4/1981 | United Kingdom | 29/723 |
| 2110385 | 6/1983 | United Kingdom | 29/723 |
| 2110867 | 6/1983 | United Kingdom | 29/723 |
| 2119309 | 11/1983 | United Kingdom | 29/723 |

OTHER PUBLICATIONS

LaGuardia, Thomas S., P.E.; "Decommissioning Methods and Equipment"; *Decontamination and Decommissioning of Nuclear Facilities;* Plenum Press, New York (Osterhout, M. M., editor) (1979); pp. 427–441.

Brengle, R. G. and Babcock, E. L.; "Equipment for Remote Dismantling"; *Decontamination and Decommissioning of Nuclear Facilities;* Plenum Press, New York, (Osterhout, M. M. editor) (1979); pp. 443–449.

*Primary Examiner*—Howard N. Goldberg
*Assistant Examiner*—Ronald S. Wallace
*Attorney, Agent, or Firm*—William R. Hinds

[57] ABSTRACT

A machine for dismantling, unloading and transferring to a disposal facility, nuclear reactor structure and/or components, which have been irradiated during operation of the reactor. The machine includes in one example a gantry mounted on a rigid, undismantled part of the reactor such as rails on the refuelling level of the reactor, a carriage angularly movable on the gantry, a platform movable linearly on the carriage, a mast on and axially movable relative to the platform, a manipulator mounted on the mast for angular and linear movement relative thereto, a variety of tools selectively mountable on the manipulator for effecting dismantling of reactor structure and/or components, and hoist means movable along a beam rotatable about the reactor center line and alignable with other beams to allow transfer of the hoist means from one beam to another. Alternative arrangements for varying the elevation of the mast are also disclosed.

9 Claims, 10 Drawing Figures

MACHINES FOR DISMANTLING DECOMMISSIONED NUCLEAR REACTORS

BACKGROUND OF THE INVENTION

This invention relates to the decommissioning of nuclear reactors which are considered to have completed their operational life, and in particular, to machines for effecting dismantling of the reactor structure in a controlled and safe manner.

When a nuclear reactor has reached the end of its planned operational life, the alternatives, after removal of the nuclear fuel and reactor coolant, are to cover the whole structure with adequate shielding, such as a mound of soil, and take precautions for the covered reactor to be preserved so shielded for all time as a permanent 'memorial', or to dismantle the structure of the reactor and dispose of the dismantled material in small amounts in conventional safe storage facilities, and as a result, restore the reactor site to its pre-building state. The latter course is to be preferred, especially in view of doubts concerning the practicability of preserving the shielding integrity of the whole reactor structure over the period of thousands of years necessary before biologically unsafe amounts radioactivity will have decayed away.

To put the present invention into context, consider a conventional gas-cooled, graphite moderated, nuclear reactor which has within a pressure vessel a core including the moderator and the fuel elements, the latter being capable of being charged and discharged by a refuelling machine, and surrounding the core, heat exchangers which remove heat from coolant heated by circulation through the core and employ the removed heat to generate electricity, for example employing steam and a turbine. When such a reactor has completed its operational lifetime, let it be assumed that a decision has been reached to dismantle the reactor and restore the site. After normal discharge of the fuel elements and blow-down of the coolant gas it is considered acceptable from a safety point of view to employ conventional dismantling techniques for removal of the turbines, heat exchangers, refuelling machine and, with adequate temporary shielding, the top dome of the pressure vessel so as to expose the core. In order to dismantle and remove the pressure vessel and to unload and transfer to to disposal facility the graphite moderator (which is in discrete block form) and other vessel internals, a machine is required which will perform these operations safely and expeditiously, and it is an object of the present invention to provide such a machine.

FEATURES AND ASPECTS OF THE INVENTION

According to the invention, a machine for dismantling, unloading and transferring to a disposal facility, nuclear reactor structure, including components which have been irradiated during operation of the reactor, comprises a vertically extending mast of adjustable longitudinal extent, means supporting the mast from a rigid, undismantled part of the reactor whereby the mast extends into a pressure vessel of the reactor located beneath the supporting means, means for moving the mast transversely of its longitudinal axis whereby the mast can be moved into different positions within the interior of the pressure vessel, a manipulator mounted on the mast for movement relative thereto and for supporting and operating a variety of tools for effecting dismantling of the structure, a movable beam mounted beneath the supporting means and above the pressure vessel, the beam extending transversely of the mast and being movable angularly in a horizontal plane over an area encompassing the range of the transverse movement of the mast, hoist means mounted for traverse along the beam and extendable into the pressure vessel for lifting parts of the pressure vessel after such parts have been prepared for dismantling by the tool-supporting manipulator, and at least one fixed beam mounted in the same horizontal plane as the movable beam for registration with the movable beam when the latter is in a predetermined angular orientation, the fixed beam when so registered forming a continuation of the movable beam whereby the hoist can be transferred from the movable beam onto the fixed beam and tranversed to an unloading station. The movable beam may be mounted on a ring girder secured to the reactor structure to enable the movable beam to be rotated about the center line of the pressure vessel. The movable beam may be mounted on the mast. The supporting means may include structure rotatable about a vertical axis whereby the mast can be moved along an arc-shaped path within the pressure vessel. The machine may include a radiation shield mounted for rotation above the movable beam, the radiation shield including an eccentrically-disposed entry opening through which the mast and the toll-carrying manipulator pass when the mast is extended into the pressure vessel, the mast being retractable in its entirety through the opening together with the manipulator, and the radiation shield including a removable section for insertion into the entry opening when the mast is so retracted. The mast may comprise an assembly of sections arranged so that sections can be added to and removed from the assembly to extend and retract the mast respectively. The mast may be of telescopic construction.

Also in accordance with the invention, a machine for dismantling, unloading and transferring to a disposal facility, nuclear structure, including components which have been irradiated during operation of the reactor, comprises a gantry, means mounting the gantry on a rigid, undismantled part of the reactor, a carriage mounted on the gantry for rotation about a vertical axis, a platform mounted on the carriage for movement diametrally thereof, a vertically extending mast of adjustable longitudinal extent supported by the platform whereby the mast extends into a pressure vessel of the reactor located beneath the gantry, the gantry, carriage and platform serving to move the mast transversely of its longitudinal axis whereby the mast can be moved into different positions within the interior of the pressure vessel, a manipulator mounted on the mast for movement relative thereto and for supporting and operating a variety of tools for effecting dismantling of the structure, a radiation shield mounted for rotation beneath the carriage and platform, the shield including an eccentrically disposed entry opening through which the mast passes when extended into the pressure vessel, the mast being retractable in its entirety through the opening together with the manipulator, and the shield including a removable closure section for insertion into the opening when the mast in so retracted, a movable beam mounted beneath the radiation shield and above the pressure vessel, the beam extending transversely of the mast and being movable angularly in a horizontal plane over an area encompassing the range of the transverse movement of the mast, hoist means mounted for traverse along the beam and extendable into the pressure vessel for lifting parts of the pressure vessel after such parts have been prepared for dismantling by said tool-supporting manipulator, and at least one fixed beam mounted in the same horizontal plane as the movable beam for registration with the movable beam when the latter is in a predetermined angular orientation, the fixed beam when so registered forming a continuation of the movable beam whereby the hoist can be transferred from the movable beam onto the fixed beam and traversed to an unloading station.

DESCRIPTION OF THE DRAWINGS

Constructional examples of machine according to the invention will now be described with reference to the accompanying diagrammatic drawings, wherein:

FIG. 1 is a side view in section and

Like reference numerals in the drawings illustrate like parts.

DESCRIPTION OF THE PREFERRED EMBODIMENTS

Figure 1:
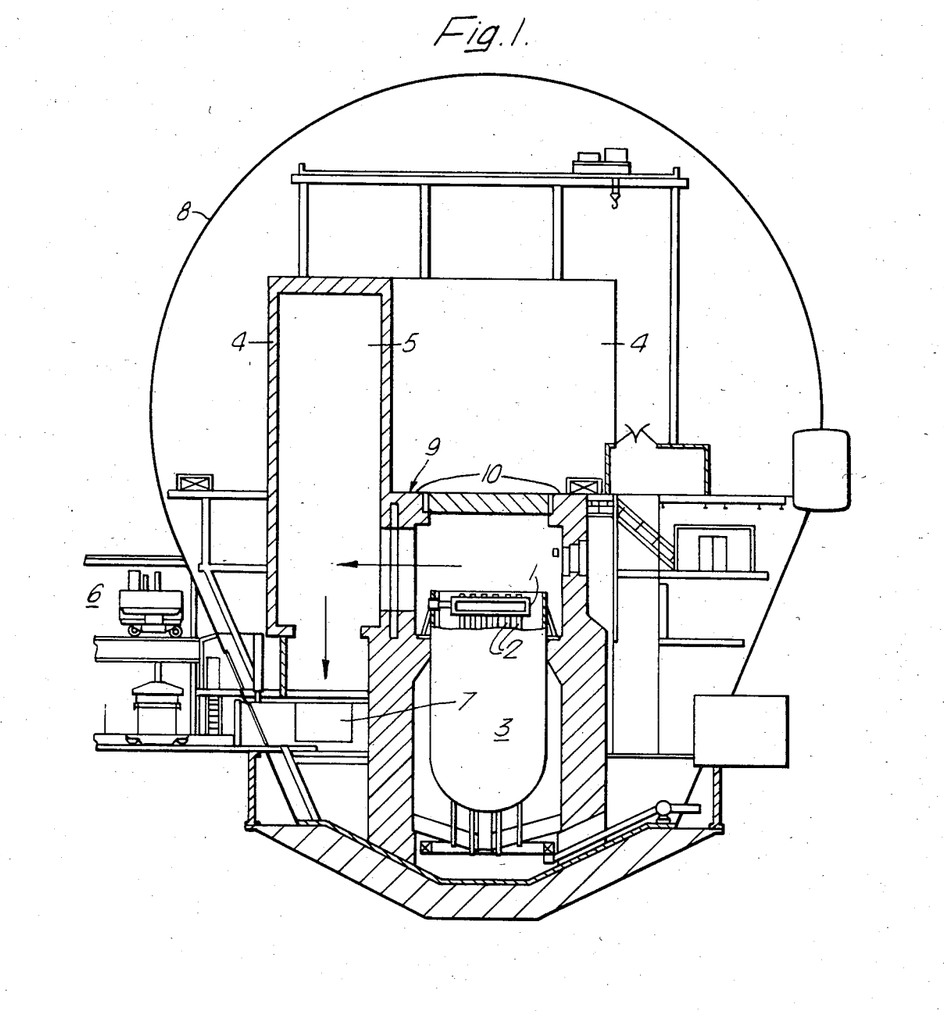
Figure 2:
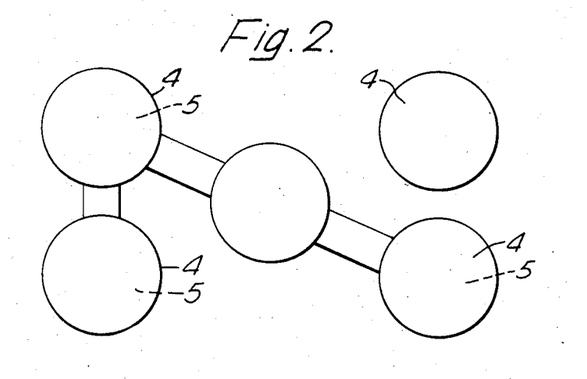
FIG. 2 a plan view of a nuclear reactor which it is intended to dismantle with the aid of one of the machines shown in FIGS. 3–10.

Referring firstly to FIGS. 1 and 2, these FIGS. show in diagrammatic form the gas-cooled, graphite moderated, nuclear reactor known as the Windscale Advanced Gas-Cooled Reactor (WAGR), which has now completed its useful life and is to be dismantled. The reactor core (not shown), which includes the graphite moderator and fuel element channels, and other internals such as core support (not shown), hot box 1 and refuelling standpipes 2, are contained in a pressure vessel 3, the upper dome and the upper parts of the standpipes 2 of which are shown removed. The volume which the upper dome occupied is intended to be employed for a dismantling, unloading and transferring machine, such as one of those subsequently described herein and referred to hereinafter inclusively as a 'handling machine'. The reactor also has four heat exchanger housings 4, from which the heat exchangers have been dismantled and removed by conventional means with shielding precautions, since the radioactivity level of these structures is such as to permit such operations. One of the buildings 4 (when emptied) is employed as a temporary repository 5 for dismantled material, in which sorting and designation for packaging in a communicating building 6 is carried out, small size material which can be disposed of in bulk being dropped into a waste container 7 beneath the temporary repository 5. The outer containment 8 of the reactor is retained and helps to retain integrity during dismantling and related operations. The packaging building 6 is outside the containment 8 and communicates via an air lock (not shown).

The refuelling floor level is designated 9 in FIG. 1, and is provided with rails 10 for the reactor refuelling machine (already removed) to run on.

Figure 3:
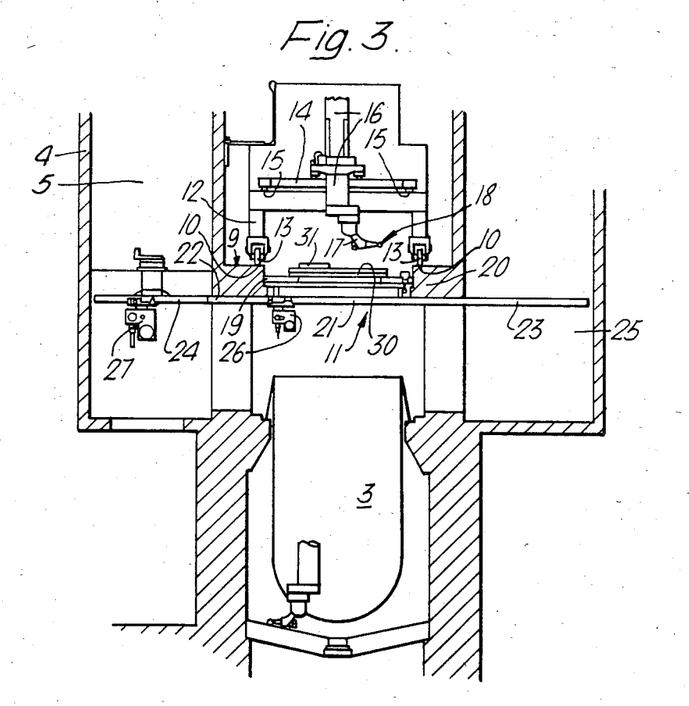
FIG. 3 is a side view, FIG. 4 a plan view and FIG. 5 a perspective view of one construction of machine in operative position.
Figure 4:
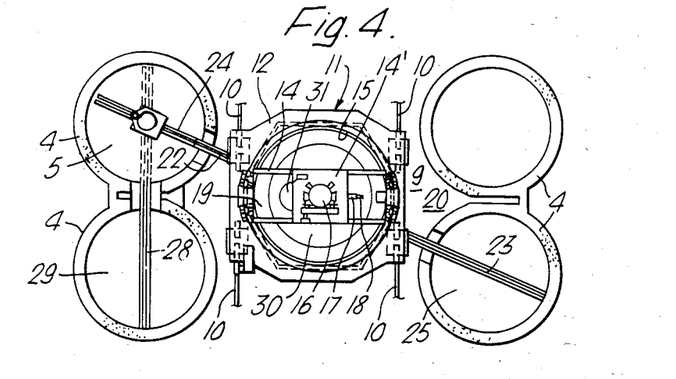
Figure 5:
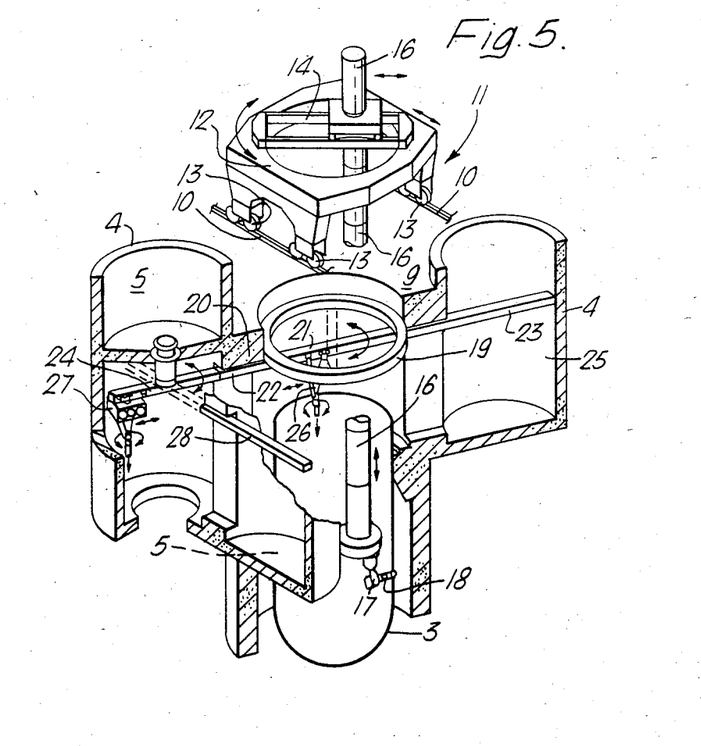

FIGS. 3–5 show the reactor with a handling machine 11 in position. The machine 11 consists of a gantry 12 with wheels 13 running on the said rails 10, and a carriage 14 able to move angularly relative to the gantry 12 on a rail 15 on the gantry 12 (see particularly FIGS. 4 and 5). The carriage 14 carries on a platform 14' movable linearly on the carriage 14 a mast 16 able to be extended and made shorter relative to the carriage 14 in a direction parallel to the axis of the reactor pressure vessel 3. There is a manipulator 17 mounted on the lower end of the mast 16 and moveable in an angular and linear manner relative thereto, the manipulator 17 being capable of carrying cutting and the like tools 18 by means of which the pressure vessel 3 and vessel internals may be dismantled prior to transfer for packaging. The mast 16 can be extended or made shorter by adding or taking away separate sections provided with appropriate secure fastening expedients (not shown) of conventional kind.

A ring girder 19 carried by the reactor concrete structure 20 provides a track for a slew beam 21 to be rotated about the vessel centre line and in one angular position to be aligned and registered with fixed beams 22, 23. The beam 22 is an intermediate between the beam 21 and another slew beam 24 rotatable about the centre line of that heat exchanger housing 4 which is used as the temporary repository 5. The beam 23 is a fixed beam extending into another heat exchanger housing 4, designated 26 and employed as a maintenance cell. There are for example two hoists 25, 27 movable along the beams 21, 22, 23, 24, the hoist 26 operating normally over the vessel 3 and movable into the cell 25, and the hoist 27 being normally situated over the repository 5 and on the slew beam 24 but being movable from the beam 24 to the beam 21 via the beam 22 and vice versa for transfer of material between the area of vessel 3 and the repository 5. There is another fixed beam 28 with which beam 24 can be aligned and registered and which extends between repositor 5 and another of the empty heat exchanger housings 4, this being designated 29 and employed for temporary waste storage. The hoist 27 can be made to travel from beam 24 to beam 28 and vice versa. There is remotely controlled mechanism provided (not shown) for controlling and rotating the beams 21, 24 and for moving and operating the hoists 26, 27.

It is envisaged that the manipulator 17 and tools 18 are to be employed to cut the material of the pressure vessel into manageably-sized pieces, and that the hoist 26 with the aid of conventional gripping or possibly magnetic lifting means on the end of the hoist cable (not shown), be used to transfer the pieces when cut to the repository 5 and thence to the packaging building 6 or to the temporary storage are 29. Furthermore, the hoist 26 would be used to pick up and transfer dismantled moderator blocks piecemeal to 5, 6 or 29.

In order to permit short-term access to the gantry 12, carriage 14 and the upper area occupied by these components, and to obviate undue exposure of the components to radiation from vessel 3 and the vessel internals, rotatable shielding 30 with an eccentrically disposed removable shield circle 31 is provided to span the ring girder 20 (see FIGS. 3 and 4), the mast 6 being extendable, and the hoist 26 being operable, through the hole provided in the shielding 30 suitably rotated, when the circle 31 is removed. FIG. 5 shows the mast 6 in its extended position with the manipulator 17 and tools 18 in position for attacking the material of vessel 3, whereas FIG. 3 shows the mast 6, manipulator 7 and tool 8 in retracted position.

Figure 6:
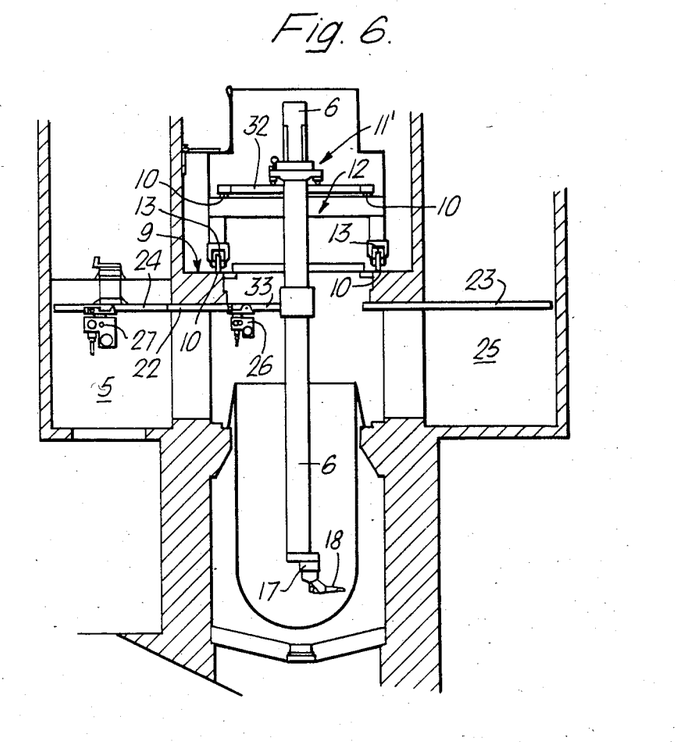
FIG. 6 is a side view, FIG. 7 a plan view and FIG. 8 a perspective view of another construction of machine in operative position.
Figure 7:
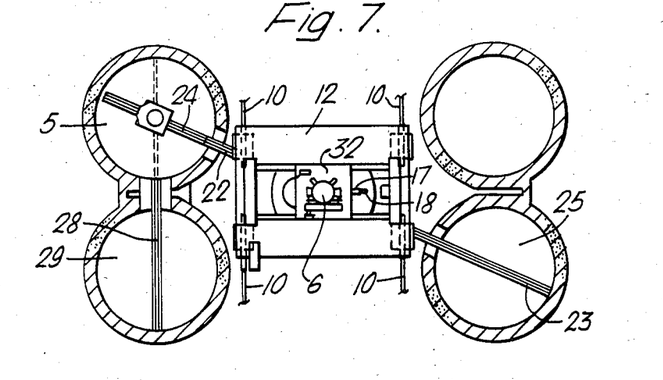
Figure 8:
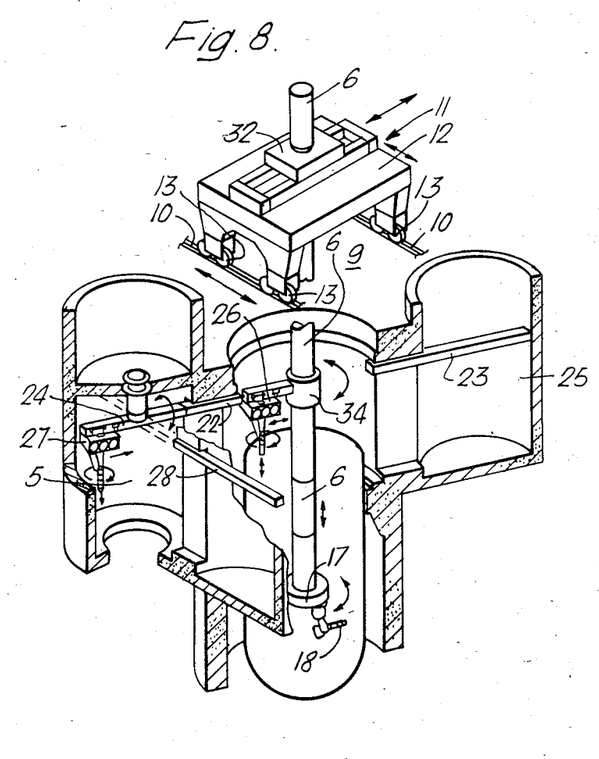

In an alternative construction, illustrated in FIGS. 6, 7 and 8, the handling machine 11' has a gantry 12 similar to the gantry 12 of the FIGS. 3-5 construction, with wheels 13 able to run on the existing rails 10 on the reactor charge face 9. A carriage 32 is mounted on the gantry 12 for cross-travel thereon. A mast 6 similar to the mast 6 of the FIGS. 3-5 construction is mounted on the carriage 32 and carries, as in the FIGS. 3-5 construction, a manipulator 17 capable of holding a tool 18.

The main difference from the FIGS. 3-5 construction is that there is a beam 33 radially mounted on a collar 34 rotatable on the mast 6. The beam 33 can be rotated by remote control of the collar 34 and can be made to align and register with an intermediate beam 22 or with a fixed beam 23, as was the beam 21 in the FIGS. 3-5 construction, except that, in this case, alternative but not simultaneous registration is only possible. There is a slew beam 24 and fixed beam 28 as in the FIGS. 3-5 construction, and a hoist 27 operates between vessel 3 space and repository 5 or storage 29.

A hoist 26 operates on beam 33 and can move on to beam 23 to operate in maintenance cell 25 or on to beam 24 via beam 22 to operate in cell 5. As in the FIGS. 3-5 construction, the mast 6 can be extended and shortened by adding or subtracting sections.

Figure 9:
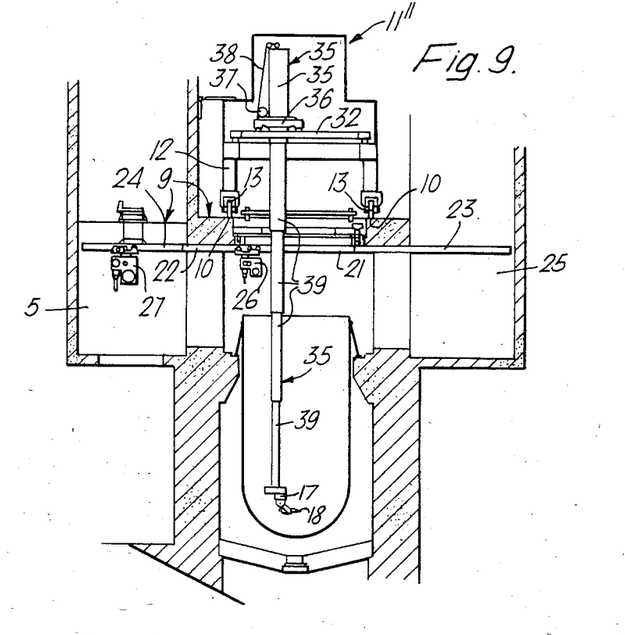
FIG. 9 is a side view and FIG. 10 a plan view of a modification.
Figure 10:
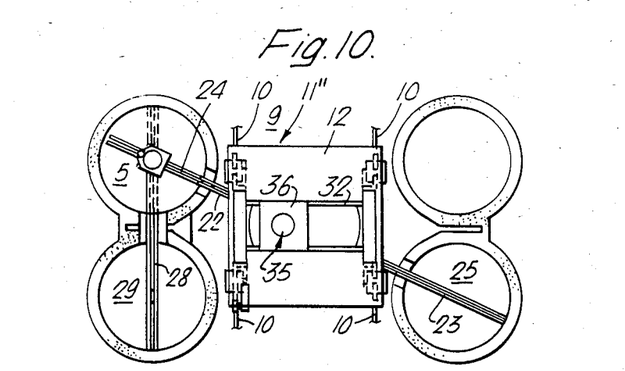

The construction shown in FIGS. 9 and 10 provides a handling machine 11" which combines the slew beam 21 construction shown in FIGS. 3-5 with the gantry 12 and cross-travel carriage 32 of the FIGS. 6-8 construction, but is varied by having a telescopic mast 35 mounted on a platform 36 on the carriage 32 and having equipment, diagrammatically indicated as a windlass 37 and cable 38, for controlling the telescoping and untelescoping of the sections 39 of the mast 35.

In a modification, not illustrated, the slew beam 21 of the FIGS. 3-5 construction can, instead of being mounted on the separate ring girder 20 on the reactor building, be suspended rigidly from the rotatable carriage 14 of that construction, and be rotatable by virtue of the controlled rotation of that carriage 14 on the gantry 12, the beam corresponding to slew beam 21 thereby having its loading transferred to the rails 10 via the wheels 13 of gantry 12.

In another modification, not illustrated, the mast may be a rigid structure, and the elevation of the manipulator and tooling mounted thereon can be varied by providing means, operable remotely, for raising and lowering the carriage relative to the gantry, whose elevation is fixed by being mounted on the side rails.

If desired, the manipulator may be mounted on an elevatable platform.

It will be appreciated that suitable biological shielding may be installed as and where necessary. For example, as floor mounted retractable shielding, and on the gantry itself, and for maintenance cell beneath the gantry.

We claim:

1. A machine for dismantling, unloading and transferring to a disposal facility, nuclear reactor structure, including components which have been irradiated during operation of the reactor, the machine comprising:
   a. a vertically extending mast of adjustable longitudinal extent;
   b. means supporting the mast from a rigid, undismantled part of the reactor whereby the mast extends into a pressure vessel of the reactor located beneath said supporting means;
   c. means for moving the mast transversely of its longitudinal axis whereby the mast can be moved into different positions within the interior of said pressure vessel;
   d. a manipulator mounted on the mast for movement relative thereto and for supporting and operating a variety of tools for effecting dismantling of said structure;
   e. a movable beam mounted beneath said supporting means and above the pressure vessel, said beam extending transversely of the mast and being movable angularly in a horizontal plane over an area encompassing the range of said transverse movement of the mast;
   f. hoist means mounted for traverse along said beam and extendable into said pressure vessel for lifting parts of the pressure vessel after such parts have been prepared for dismantling by said tool-supporting manipulator; and
   g. at least one fixed beam mounted in the same horizontal plane as said movable beam for registration with the movable beam when the latter is in a predetermined angular orientation, said fixed beam when so registered forming a continuation of the movable beam whereby the hoist can be transferred from the movable beam on to the fixed beam and traversed to an unloading station.

2. A machine as claimed in claim 1 in which said movable beam is mounted on a ring girder secured to the reactor structure to enable the movable beam to be rotated about the centre line of said pressure vessel.

3. A machine a claimed in claim 1 in which said movable beam is mounted on the mast.

4. A machine as claimed in claim 1 in which said supporting means includes structure rotatable about a vertical axis whereby the mast can be moved along an arc-shaped path within said pressure vessel.

5. A machine as claimed in claim 4 including a radiation shield mounted for rotation above said movable beam, said radiation shield including an eccentrically-disposed entry opening through which the mast and said tool-carrying manipulator pass when the mast is extended into said pressure vessel, the mast being retractable in its entirety said opening together with said manipulator and said radiation shield including a removable section for insertion into said entry opening when the mast is so retracted.

6. A machine as claimed in claim 5 in which the upper part of the mast is located above said radiation shield.

7. A machine as claimed in claim 1 in which the mast comprises an assembly of sections arranged so that sections can be added to and removed from the assembly to extend and retract the mast respectively.

8. A machine as claimed in claim 1 in which the mast is of telescopic construction.

9. A machine for dismantling, unloading and transferring to a disposal facility, nuclear reactor structure, including components which have been irradiated during operation of the reactor, the machine comprising:
   a. a gantry;
   b. means mounting the gantry on a rigid, undismantled part of the reactor;
   c. a carriage mounted on the gantry for rotation about a vertical axis;

d. a platform mounted on the carriage for movement diametrally thereof;

e. a vertically extending mast of adjustable longitudinal extent supported by said platform whereby the mast extends into a pressure vessel of the reactor located beneath said gantry, said gantry, carriage and platform serving to move the mast transversely of its longitudinal axis whereby the mast can be moved into different positions within the interior of said pressure vessel;

f. a manipulator mounted on the mast for movement relative thereto and for supporting and operating a variety of tools for effecting dismantling of said structure;

g. a radiation shield mounted for rotation beneath said carriage and platform, said shield including an eccentrically disposed entry opening through which the mast passes when extended into the pressure vessel, th mast being retractable in its entirety through said opening together with said manipulator and the shield including a removable closure section for insertion into said opening when the mast is so retracted;

h. a movable beam mounted beneath said radiation shield and above the pressure vessel, said beam extending transversely of the mast and being movable angularly in a horizontal plane over an area encompassing the range of said transverse movement of the mast;

i. hoist means mounted for traverse along said beam and extendable into said pressure vessel for lifting parts of the pressure vessel after such parts have been prepared for dismantling by said tool-supporting manipulator; and j. at least one fixed beam mounted in the same horizontal plane as said movable beam for registration with the movable beam when the latter is in a predetermined angular orientation, said fixed beam when so registered forming a continuation of the movable beam whereby the hoist can be transferred from the movable beam onto the fixed beam and traversed to an unloading station.

* * * * *